United States Patent [19]

Landis

[11] Patent Number: 5,532,293

[45] Date of Patent: Jul. 2, 1996

[54] MICROCAPSULE-CONTAINING COHESIVE COATING

[75] Inventor: Robert A. Landis, Dayton, Ohio

[73] Assignee: The Mead Corporation, Dayton, Ohio

[21] Appl. No.: 301,610

[22] Filed: Sep. 7, 1994

[51] Int. Cl.⁶ .............................. C08K 9/10; C08K 9/12
[52] U.S. Cl. ............................ 523/210; 523/211
[58] Field of Search .................... 523/210, 211; 493/330, 331

[56] References Cited

U.S. PATENT DOCUMENTS

| | | | |
|---|---|---|---|
| 4,464,158 | 8/1984 | Kardon | 493/265 |
| 4,925,517 | 5/1990 | Charbonneau et al. | 156/276 |
| 4,940,852 | 7/1990 | Chernack | 523/211 |

Primary Examiner—Paul R. Michl
Assistant Examiner—LaVonda R. DeWitt
Attorney, Agent, or Firm—Thompson Hine & Flory

[57] ABSTRACT

An adhesive system comprising an activatable, non-tacky cohesive material dispersed in a nonadherent material, said nonadherent material reducing the coefficient of friction of said cohesive material and rendering said cohesive material non-coherent; and a plurality of microcapsules dispersed in said nonadherent material and said cohesive material, said microcapsules encapsulating a solvent for said cohesive and being rupturable upon the application of pressure, wherein upon the application of pressure, the microcapsules rupture and release said solvent and said solvent dissolves said cohesive material such that said cohesive material becomes coherent.

12 Claims, 1 Drawing Sheet

MICROCAPSULE-CONTAINING COHESIVE COATING

BACKGROUND OF THE INVENTION

The present invention relates to a microcapsule-containing adhesive system and method of using the same wherein the microcapsules are filled with a solvent which is capable of rendering the adhesive adherent. More particularly, the present invention relates to an adhesive-system which can be used to seal a facsimile document in an envelope before it leaves the facsimile machine so that it cannot be read without evidencing tampering.

Facsimile machines are now used almost universally in business. With the widespread use of these machines, a need has arisen to transmit documents in a strictly confidential manner. Currently this is not generally possible unless the intended recipient of the confidential document personally monitors the facsimile machine and gathers the document immediately as it is received. It has been proposed to design facsimile machines in which the transmitted document is automatically inserted into a tamper-evident envelope before it exits the facsimile machine so that the facsimile machine attendant cannot see the document and it is not necessary to stand by the machine and wait for transmission of the document.

While envelopes which are sealed with tamper-evident adhesives (so called tamper-evident envelopes) are known, the adhesives used in conjunction with these envelopes have not been satisfactory for use in a facsimile machine. The adhesives used in tamper-evident envelopes are often covered with a release film which is removed by the user immediately prior to sealing the envelope. The removal of such a release film is difficult to perform within the design limitations of conventional facsimile machines.

Another class of known adhesives which is used on most common envelopes is soluble adhesives which requires a solvent to activate the adhesive and produce its tackiness. These adhesives are also unsuitable for use in facsimile machines because a means must be provided to wet the adhesive and the adherents must be set and joined with speed and precision immediately after the solvent has been applied and the adhesive activated.

Adhesive systems employing microcapsules have been disclosed in the patent literature. One known system comprises a curable adhesive which contains rupturable microcapsules filled with a curing agent. See for example U.S. Pat. No. 4,940,852 to M. Chernack. An adhesive system containing microcapsules is also shown in U.S. Pat. No. 4,925,517 to Charbonneau et al. In this system, two substrates are temporarily adhered together with an adhesive which contains microcapsules filled with a fragrant liquid. When the adherents are pulled apart, the microcapsules break, releasing the fragrance. A further example is seen in which an adhesive coating, including a latex carrier having solvent-filled microcapsules is coated on a threaded fastener such as a bolt. When these microcapsules rupture, the solvent cures the adhesive to secure the fastener.

One of the most critical problems which arises in designing an adhesive for use in a tamper-evident envelope for use in a facsimile machine is that the envelopes or the substrate from which they are formed must be stacked together and folded and assembled with the document within the fax machine. This requires that the adhesive be non-tacky and have a low coefficient of friction. If the adhesive is tacky, the envelopes will stick together while they are stacked in the machine. If the adhesive exhibits a high coefficient of friction, it will interfere with handling the envelope and feeding the envelope through the machine as one envelope will drag another envelope along or cause misfeeds within the fax machine. While cohesives (as hereafter defined) are not tacky, they often exhibit a coefficient of friction which results in misfeeds.

Therefore, it is an object of the present invention to provide an adhesive system which is non-tacky and exhibits a low coefficient of friction, and which can be rendered adherent to provide a seal which is tamper-evident.

Summary

In accordance with the present invention, an adhesive system is provided which comprises a cohesive material dispersed in a nonadhesive material which renders the cohesive non-coherent, and a plurality of microcapsules associated with the cohesive, the microcapsules being rupturable upon the application of pressure and releasing a solvent for the cohesive which renders the cohesive adherent.

It is also an object of the present invention to provide a tamper-evident envelope having a layer of adhesive adjacent an opening in the envelope, wherein the adhesive provides cohesion between two portions of the envelope, such as the pocket and the closure flap, the adhesive system comprising a cohesive material adhered to a portion of the envelope, the cohesive material is dispersed in a nonadhesive material such that the cohesive is essentially not coherent, and a plurality of pressure-rupturable microcapsules associated with the cohesive material, the microcapsules containing a solvent, which when released from the microcapsules dissolves the cohesive material such that the cohesive material is rendered coherent. The term "cohesive" as used herein means a non-tacky material which does not adhere to foreign surfaces upon contact but which will adhere to itself. By using an activatable cohesive material in accordance with the present invention instead of an inherently tacky adhesive, the cohesive can be coated on a sheet of paper and the sheets of paper can be used in a fax machine as an envelope or to form an envelope.

It is a more particular object of the present invention to provide a method of providing tamper-evident adhesion between two adhesively-united portions of an envelope which is sealed before it leaves a facsimile machine comprising the steps of providing a substrate having an activatable cohesive coating on a portion thereof, the coating being a dried cohesive latex containing gelatin and a plurality of solvent-filled microcapsules, folding the substrate such that two areas of the substrate coated with the activatable cohesive coating overlie one another, applying pressure to rupture the microcapsules, and cause the solvent to be released such that the solvent dissolves the cohesive and forms a cohesive bond which seals the envelope, the seal being such that fiber tear of the envelope occurs before adhesive bond failure when a user opens the envelope.

BRIEF DESCRIPTION OF THE DRAWINGS

The invention will now be described by way of example and with reference to the accompanying drawings, in which.

DETAILED DESCRIPTION OF THE PREFERRED EMBODIMENT

Those skilled in the art will appreciate that the adhesive system of the present invention can be used on an envelope in the conventional sense, e.g., a paper having a pre-folded pocket, or on a sheet of paper which is subsequently folded to contain a document therein. In the case of a pre-folded envelope, the adhesive system can be applied around the edge of the pocket and the closure flap. In the case of a sheet of paper, it can be applied at the four side margins to seal the paper when folded. The term "envelope" as used herein shall include both the pre-folded and the unfolded variety.

The adhesive of the present invention contains a dispersed cohesive. The cohesive is a conventional polymeric material which is not tacky to the touch but which will adhere to itself. This cohesive is dispersed in a non-adherent material which renders the cohesive non-coherent. Microcapsules are associated with the system which are pressure-rupturable and filled with a solvent which is capable of dissolving the cohesive. By rupturing the microcapsules such that they release the solvent, the solvent dissolves the cohesive. It is believed that by dissolving the cohesive, the solvent produces a phase inversion whereby the cohesive moves from being a dispersed phase within the non-adherent material in which it is not coherent to a continuous phase in which it is coherent. The solvent also appears to function as a vehicle to carry the cohesive into the substrate and the mating cohesive layer so as to enhance the cohesive strength of the bond which seals the envelope. Thus, initially the adhesive system is not tacky and exhibits a low coefficient of friction so that it does not interfere with feeding the envelopes in the fax machine, but upon rupturing the capsules the adhesive is rendered adherent so that the envelope can be sealed with a tamper-evident bond.

This system will now be described in detail below with respect to the figures. It is to be understood that the forgoing general description and the following detailed description are exemplary and explanatory but are not to be restrictive of the invention. The accompanying drawings which are incorporated in and constitute a part of this invention, illustrate the embodiments of the invention, and, together with the description, serve to explain the principles of the invention in general terms. Like numerals refer to like parts throughout the disclosure.

Figure 1A:
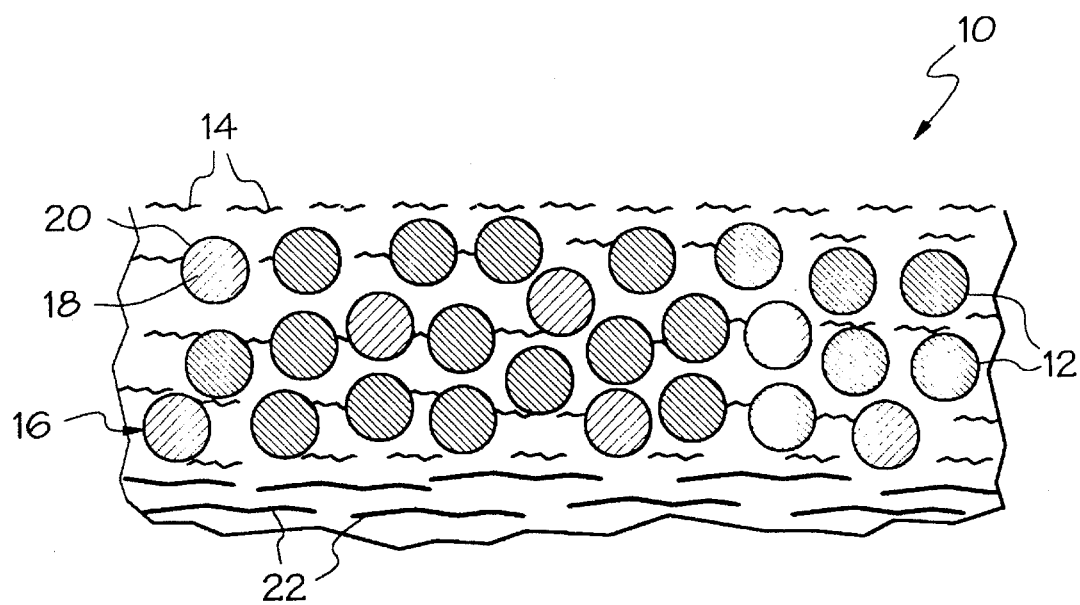
FIG. 1A is an adhesive of the present invention.

In accordance with the present invention, as shown in FIG. 1A, the adhesive system 10 comprises a cohesive 12 interspersed in a non-adherent material 14 which blocks the cohesiveness of the cohesive and reduces the coefficient of friction during handling in the fax machine. The system is preferably a water-based, continuous phase system containing a dispersed cohesive polymer.

This non-adherent material 14 can be any continuous phase film former. One example of a useful non-adherent material is a water-soluble protein such as a gelatin, or any other film forming material which lowers the coefficient of friction of the cohesive to an acceptable level (about 0.4–0.5) so that the adhesive will not cause misfeeds during handling in a facsimile machine. The selection of the non-adhesive film former will depend on a number of factors including the surface area covered by the adhesive (e.g., as the area increases, films which have any tendency to stick or block may not be useful), the nature of the adherent, the composition of the adhesive, and the composition of this non-adherent material. Other examples of non-adherent materials include starch, water-soluble gums, polyvinyl pyrrolidone, alginates, and polyvinyl alcohol. An exemplary amount of non-adherent material is about 5 to 15% of the composition based on total solids. A preferable non-adherent material composition is typically about 5% aqueous gelatin solution dissolved in a continuous water phase, wherein there is an about 5–15%, preferably 10%, ratio of the gelatin solids to cohesive solids in the aqueous dispersion. The gelatin must be in aqueous solution in order to incorporate it into the adhesive composition.

In order to provide a tamper-evident seal, a cohesive is preferably selected which, once it is adhered to itself to seal the envelope, it causes fiber breakage to occur when the envelope is opened. Thus, the strength of the cohesive must be greater than the force required to remove or break fibers from the envelope. The selection of the particular cohesive will depend upon the nature of the paper making up the envelope. Weaker cohesives can be employed with papers exhibiting weak fiber bonding.

Representative examples of cohesives that may be used in the present invention include rubber latexes. A particularly useful cohesive is BL-3076 from Basic Adhesives, Inc., which is natural rubber latex consisting mainly of cis-polyisoprene. Many cohesives tend to exhibit high creep which would permit an envelope to be opened without evidence of tampering, it is desirable to add a high molecular or macromolecular, water dispersable material such as a resin or gelatin to the cohesive to reduce creep and enhance the adhesive strength. This way fiber tear will occur when the envelope is opened. Representative examples of resins which can be used for this purpose have a moderate glass transition temperature typically greater than about 5° C., such as ethylene-vinyl acetate copolymer. The non-adherent material may also function to reduce creep. This is the case with gelatin which can be used to shield the cohesive property of the cohesive and to reduce its creep.

The term "high molecular or macromolecular material" as used herein refers to natural and synthetic polymers preferably having a molecular weight greater than about 20,000. Representative examples of materials which can be used in the invention include vinyl acetate latices, SB-latices, formaldehyde polymers, acrylic latices, and polymeric wax dispersions.

A ratio of high molecular material to cohesive material of about 1:10 to 1:1, preferably 1:2 can be used. An exemplary amount of high molecular material is about 10°30% solids. In one embodiment, the high molecular material is EVA copolymer having a molecular weight of greater than about 70,000 used in a ratio to the cohesive of about 1:4 to 1:1, preferably 1:2.

This mixture may be applied to the substrate in any amount which is appropriate based on the composition of the substrate, etc. A typical coat weight is about 1 to 5 lbs/1300 sq. ft. This mixture produces an excellent bond which will not fail before the paper tears (i.e. the bond is such that when the envelope or other adherent is opened the paper or other substrate tears before the failure of the adhesive bond) thereby providing a tamper-evident adherent.

The adhesive system includes liquid-filled microcapsules 16. Processes for forming microcapsules are well known in the art. Any conventional process can be used herein such as coacervation, interfacial polymerization or in situ polymerization. Some common microcapsule wall formers are gelatin, ureaformaldehyde, melamineformaldehyde, polyurea, and polyureaurethane. The material and thickness of this shell material must be chosen such that it will rupture upon the application of pressure but will prevent premature release of its contents during the application of the adhesive.

Preferably, the microcapsule is a polyurea microcapsule as shown in the following example.

Figure 1B:
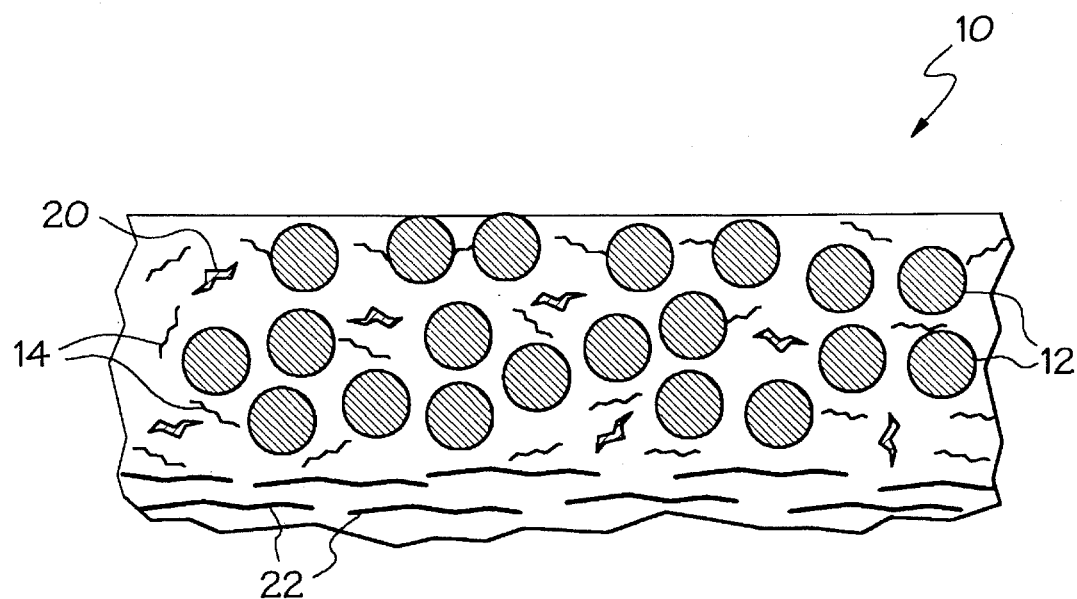
FIG. 1B is an adhesive of the present invention after the rupturing of the microcapsules.

The microcapsules contain an encapsulated solvent for the cohesive. Non-polar solvents are preferred because they dissolve the cohesive and they are compatible with microencapsulation procedures which require formation of an oil-in-water emulsion. Upon the application of pressure, the walls of the microcapsules 20 of the present invention will rupture, causing the solvent 18 to be discharged. The selection of the solvent will depend on the nature of the non-adherent material and the cohesive. The solvent must dissolve the cohesive without substantially dissolving the non-adherent material. Examples of solvents include nonpolar, non-volatile hydrocarbons having 10–18 carbon atoms. A useful solvent for a cohesive is an alkyl biphenylaliphatic hydrocarbon mix of 80% SURE SOL 290 from Koch Chemical Co. and 20% EXXSOL D110 from Exxon. When the solvent dissolves the cohesive, as shown in FIG. 1B, the cohesive is carried out of the non-adherent material, the adhesive system regains its cohesive character and is ready to be adhered to the adherent.

As a result of the rupture of the microcapsules, the gelatin 14 is dispersed in the adhesive system, along with the remains of the capsule walls 20. The cohesive system is believed to form a continuous hydrophobic phase.

The size of the microcapsules is not particularly critical to the invention and may, for example, range from about 2 to 20 microns, particularly about 8 microns. The thickness of the microcapsules walls, is not critical but should be sufficiently thick to maintain the solvent in a separate state over a prolonged period of time and thin enough to allow the microcapsules to be ruptured upon the application of the pressure. The concentration of the microcapsules in the adhesive system should be sufficient to provide an even distribution and a sufficient amount of the solvent to dissolve cohesive such that it exhibits adequate cohesive property to form a tamper-evident seal. A typical amount of microcapsules ranges from 10% to 50% based on total solids and particularly is about a weight ratio of 30% microcapsules to other coating solids.

The above adhesive system may be used to form a tamper-evident envelope. The adhesive is usually applied on a portion of the envelope adjacent an opening and/or on the closure flap. Alternatively, the adhesive can be applied around the perimeter of the document which is then folded upon itself and sealed as described next. The coating placement of the adhesive will vary with the design of the facsimile machine. The portion containing the adhesive coating is folded so that the adhesive layer on two portions of the envelope (e.g., adjacent the opening and on the closure flap) is in contact with itself. When two adhesive areas overlie one another, pressure is applied using a pressure roller or the like. The pressure causes the microcapsules to rupture. The solvent in the microcapsules is released which carries the cohesive into the porous paper and the mating cohesive layer which enables the adhesive to cohere to the other portion of the envelope. This provides a tamper-evident seal in which the cohesive bond is stronger than the fiber bond of the envelope. Therefore, when a user opens the envelope, the paper will rip before the cohesive bond fails. It will then be evident to anyone, merely by looking at the envelope, whether the contents have been previously viewed.

This tamper-evident envelope with cohesive system can be used in a facsimile machine to provide security. The envelope paper with the above described adhesive system is placed in the facsimile machine. Because of the non-tacky coating, envelopes will not adhere to each other when stacked or folded within the machine, nor will they adhere to the machine itself. After the transmission has been received, the document is placed on the envelope paper, the envelope is folded and pressure is applied to the adhesive, sealing the document. This breaks the microcapsules, releasing the solvent and enabling the adhesive system to secure the envelope. An addressee name can be printed on the outside of the folded envelope. The envelope exits the machine only after it has been sealed. In this manner, the operator of the machine, the messenger, etc. cannot view the document without opening the envelope. Since this is a tamper-evident envelope, which causes fiber-tear when the envelope is opened, the intended receiver can readily detect whether the contents have been previously viewed.

The invention is illustrated in more detail by the following non-limiting example.

EXAMPLE 1

A method of making a microcapsule-containing cohesive coating according to the present invention forms a solvent microencapsulated in polyurea capsules using the following method.

First, to prepare the external phase of the polyurea capsules, 13 grams of gum arabic were sifted into a beaker of 210 grams deionized (DI) water with good stirring. This was then covered and heated to 60° C. and held until the dispersion became clear. This was then allowed to cool to 20° C.

Next, the diluent was prepared by adding 4.7 grams diethylene triamine to 15.3 grams of DI water and stirred.

The internal phase was prepared by combining 156.0 g SURE SOL 290 from KOCH Chemical Co., 35.1 g EXXSOL D-110 from Exxon, 12.9 g BAYMICRON 2109(a biuret of hexamethylene di-isocynate) from Mobay Chemical Co., and 4.1 g SF-50 isocynate from BASF Corp (a proprietary isocynate prepolymer of 2,4 toluene diisocynate, and 1,3 toluene diisocynate. These ingredients were heated with stirring to 50° C. and emulsified but not cooked.

The external phase was added to a 600 ml stainless steel beaker. It was stirred with a Servodyne agitator at 1000 rpm. Slowly the internal phase was added at 50° C. This was then emulsified for 7 minutes. The speed was reduced to 800 rpm. Next, the diluent was added and the beaker was covered, heated to 65° C. and cured for 3 hours.

After the solvent was encapsulated the cohesive layer was formulated. The cohesive is made by mixing the following ingredients in the order specified. Note that the weights are wet weights.

0.615 parts water 0.116 parts Keestar 328 (cornstarch)

0,616 parts capsules 1,129 parts 5% gelatin solution 1.025 parts 3076 cohesive

Once uniformly mixed, the coating was applied with a Meyer rod to give a dry coat weight of about 2 to 5 pounds per 1300 square feet, preferably about 3 lbs/1300 sq. ft.

Bond formation will occur with application of a pressure above about 250 psi, preferably 450 psi.

Having described the invention in detail and by reference to preferred embodiments thereof, it will be apparent that modifications and variations are possible without departing from the scope of the invention defined in the appended claims.

What is claimed is:

1. An adhesive system comprising:

an activatable, non-tacky cohesive material dispersed in a nonadherent material, said nonadherent material reducing the coefficient of friction of said cohesive material and rendering said cohesive material non-coherent; and a plurality of microcapsules dispersed in said nonadherent material and said cohesive material, said microcapsules encapsulating a solvent for said cohesive and being rupturable upon the application of pressure, wherein upon the application of pressure, the microcapsules rupture and release said solvent and said solvent dissolves said cohesive material such that said cohesive material becomes coherent.

2. The adhesive system of claim 1 wherein said cohesive material is natural rubber.

3. The adhesive system of claim 2 wherein said cohesive material is a latex.

4. The adhesive of claim 3 wherein said cohesive includes a natural or synthetic polymer having a molecular weight greater than about 20,000 to reduce creep.

5. The adhesive of claim 4 wherein said synthetic polymer material is a thermoplastic resin having a glass transition temperature of greater than about 5° C.

6. The adhesive of claim 5 wherein said thermoplastic resin is an EVA copolymer.

7. The adhesive of claim 6 wherein the cohesive comprises a mixture of thermoplastic resin and latex and the ratio of EVA to latex is about 1:2.

8. The adhesive of claim 2 wherein said nonadherant material is a water-soluble film forming material.

9. The adhesive of claim 8 wherein said water-soluble film forming material is gelatin.

10. The adhesive of claim 9 wherein said cohesive material consists essentially of a natural rubber latex, said nonadherant material consists essentially of gelatin, and said solvent is a mixture of an aliphatic hydrocarbon and an alkyl biphenyl.

11. The adhesive of claim 1 wherein said solvent is non-polar organic solvent.

12. A tamper-evident envelope having a layer of adhesive thereon, wherein said adhesive provides cohesion between two portions of said envelope, said adhesive comprising:

an activatable, non-tacky cohesive material dispersed in a nonadherent material and adhered to a portion of said envelope, said nonadherent material reducing the coefficient of friction of said cohesive material, and rendering said cohesive material noncoherent; and a plurality of pressure-rupturable microcapsules dispersed in said nonadherent material and said cohesive material, said microcapsules encapsulating a solvent for said cohesive, which is released upon rupturing said microcapsules and dissolves said cohesive material such that said cohesive material is rendered coherent.

* * * * *

UNITED STATES PATENT AND TRADEMARK OFFICE
CERTIFICATE OF CORRECTION

PATENT NO. : 5,532,293
DATED : July 2, 1996
INVENTOR(S) : Robert A. Landis

It is certified that error appears in the above-indentified patent and that said Letters Patent is hereby corrected as shown below:

In Column 8, claim 8, line 1, replace "nonadherant" with --nonadherent--.

In Column 8, claim 10, line 6, replace "nonadherant" with --nonadherent--.

In Column 8, claim 12, line 22, replace "noncoherent" with --non-coherent--.

Signed and Sealed this

First Day of October, 1996

Attest:

BRUCE LEHMAN

Attesting Officer

Commissioner of Patents and Trademarks